US008621045B2

(12) United States Patent
Chen et al.

(10) Patent No.: US 8,621,045 B2
(45) Date of Patent: Dec. 31, 2013

(54) PORTABLE COMMUNICATION INTERFACE FOR ACCESSING MEDIA CONTENT

(75) Inventors: Yih-Farn Chen, Bridgewater, NJ (US); Giuseppe Di Fabbrizio, Florham Park, NJ (US); David C. Gibbon, Lincroft, NJ (US); Rittwik Jana, Parsippany, NJ (US); Bernard S. Renger, New Providence, NJ (US); Bin Wei, Basking Ridge, NJ (US); Ping-Fai Yang, Berkeley Heights, NJ (US); Hailong Sun, Beijing (CN)

(73) Assignee: AT&T Intellectual Property I, L.P., Atlanta, GA (US)

( * ) Notice: Subject to any disclaimer, the term of this patent is extended or adjusted under 35 U.S.C. 154(b) by 635 days.

(21) Appl. No.: 12/557,073

(22) Filed: Sep. 10, 2009

(65) Prior Publication Data
US 2010/0070613 A1    Mar. 18, 2010

Related U.S. Application Data

(60) Provisional application No. 61/191,896, filed on Sep. 12, 2008.

(51) Int. Cl.
*G06F 15/16* (2006.01)

(52) U.S. Cl.
USPC ........ 709/219; 709/217; 709/218; 348/14.02; 348/143

(58) Field of Classification Search
USPC .................... 709/217–219; 348/14.02–143
See application file for complete search history.

(56) References Cited

U.S. PATENT DOCUMENTS

| | | | |
|---|---|---|---|
| 6,127,941 A | 10/2000 | Van Ryzin | |
| 6,346,934 B1 | 2/2002 | Wugofski | |
| 7,251,561 B2 * | 7/2007 | Dotan et al. | 701/207 |
| 8,122,475 B2 * | 2/2012 | Osann et al. | 725/82 |
| 2002/0170062 A1 | 11/2002 | Chen et al. | |
| 2003/0120135 A1 * | 6/2003 | Gopinathan et al. | 600/300 |
| 2004/0030493 A1 * | 2/2004 | Pechatnikov et al. | 701/208 |
| 2005/0096042 A1 * | 5/2005 | Habeman et al. | 455/422.1 |
| 2005/0188056 A1 * | 8/2005 | Kangas et al. | 709/218 |
| 2006/0089160 A1 * | 4/2006 | Othmer | 455/457 |
| 2006/0190624 A1 * | 8/2006 | Kegoya et al. | 709/246 |
| 2007/0203968 A1 * | 8/2007 | Jung et al. | 709/200 |
| 2007/0204014 A1 * | 8/2007 | Greer et al. | 709/219 |
| 2007/0271367 A1 * | 11/2007 | Yardeni et al. | 709/223 |
| 2008/0155453 A1 * | 6/2008 | Othmer | 715/774 |
| 2008/0201754 A1 * | 8/2008 | Arling et al. | 725/114 |
| 2008/0209065 A1 * | 8/2008 | Gan | 709/231 |
| 2008/0209487 A1 * | 8/2008 | Osann et al. | 725/109 |
| 2009/0171939 A1 * | 7/2009 | Athsani et al. | 707/5 |
| 2009/0315972 A1 * | 12/2009 | Rensin et al. | 348/14.02 |

* cited by examiner

*Primary Examiner* — Wing F Chan
*Assistant Examiner* — Razu Miah
(74) *Attorney, Agent, or Firm* — Wolff & Samson, PC

(57) ABSTRACT

A method and apparatus for accessing media with a portable communication device presents media available for display to a user based on user preferences. A user can select media to be output from an external display by entering commands into the portable communications device. In addition, a second external display can be used to display a subset of the media available for display.

28 Claims, 8 Drawing Sheets

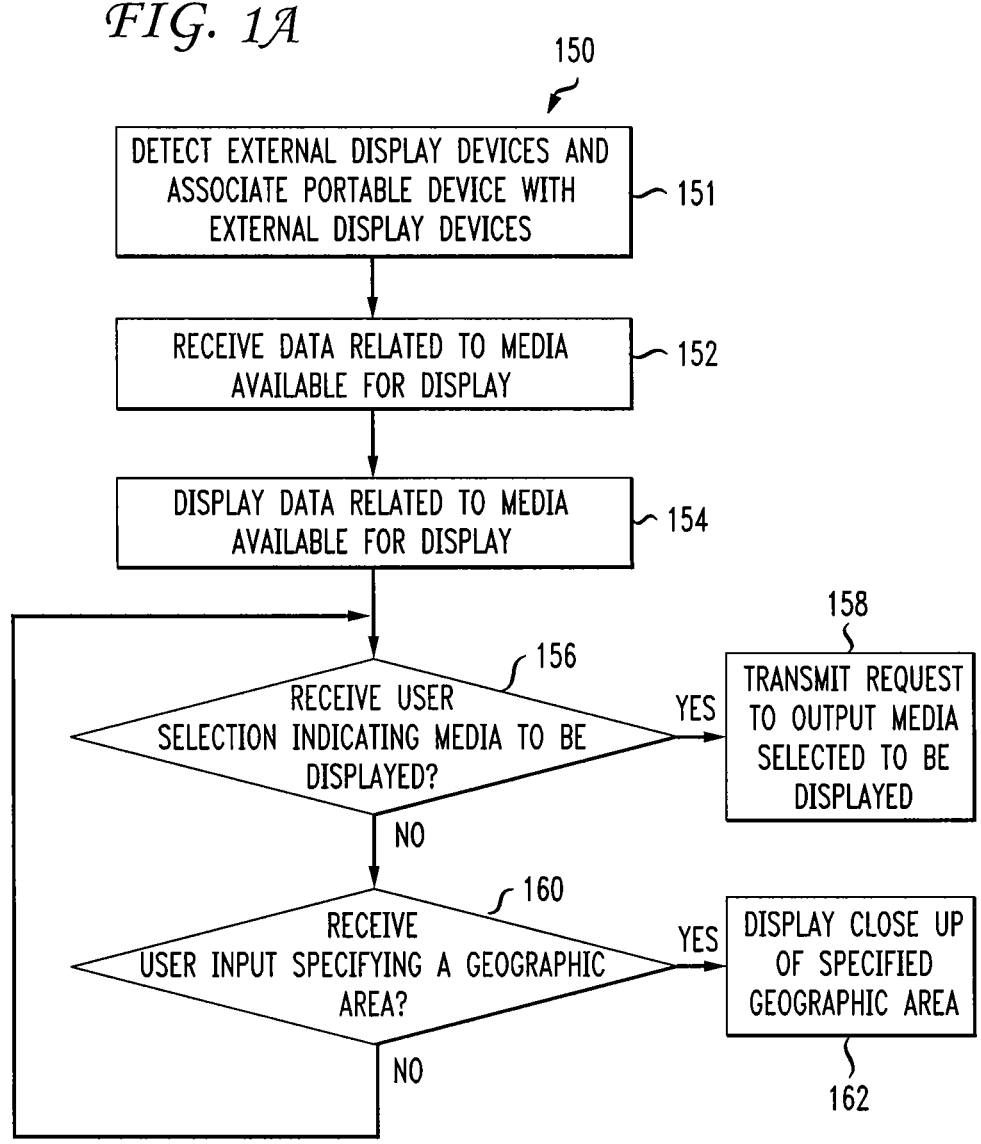

MediaAlerts for Robin Chen    *FIG. 7*
Tue 8/19/2008 00:19:52

 Sunday, August 17, 2008 6:45 PM
GeoTracker (212 seconds)

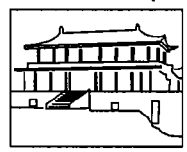 Clear blue sky probably 70 degrees, nicest morning we have had here. This is in Beijing, Tiananmen Square, live picture.... Unlike the thousands of other Chinese who earn degrees from universities in The United States, Wang can never return home to China.... For me, the most important thing is I can go back to China with my family

 Sunday, August 17, 2008 8:58 AM
GeoTracker (56 seconds)

 New world record and gold medal number one of The Beijing games. Perfect five in Beijing is Phelps... History for Michael Phelps.....

 Friday, August 15, 2008 6:49 PM
GeoTracker (218 seconds)

 A quick look at Wall Street back home in New York today.... Well, back at our making a difference segment this Friday Night, and for all the talk about how spoiled our children can sometimes be back home in The United States, here in China It's a unique dynamic because of the government enforced so called one child policy that's been in place for decades now. From the car to the iPHONE, the 27 year old marketing executive is a child of the new China.... Reporter they arrived from all over China, often with only the vaguest idea of how to help...

 Thursday, August 14, 2008 6:28 PM
GeoTracker (895 seconds)

 To-back-to-back .... 10:48 PM New York Time.....Coming up tonight on the Late Edition of News 4 New York after the Olympics..... And that's all for this edition of the news 4 New York at six.....

 Wednesday, August 13, 2008 6:56 PM
GeoTracker (403 seconds)

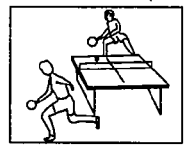 We have another comeback story when we come back... Our final story here tonight from Beijing combines a lot of things, chief among them, table tennis, Ping-Pong the closest thing there is to a national sport here in China...That changed when he met a man in New York.... Born in China With reflexes, she was the top junior player at age 14.....

FIG. 8

Update Your Account
MediaAlertPages
2 Your Topics of Interest

| Add a new topic | | | Source | Notification | iPod Video | Nano/Shuffle |
|---|---|---|---|---|---|---|
| Edit | GeoTV | Delete | Main | None | ⬤) | ⬤) |
| Edit | Hot Topics | Delete | Main | None | ⬤) | ⬤) |
| Edit | Companies | Delete | Main | None | ⬤) | ⬤) |
| Edit | Telecom | Delete | Main | None | ⬤) | ⬤) |
| Edit | Weather and Disasters | Delete | Main | None | ⬤) | ⬤) |

3 Your eClips Source
Press Update after selecting or modifying your news sources
[Update]

Clear All   Check All   Generate Clips
General
 ☐ CNBC Closing Bell
 ☐ CSPAN One
News
 ☐ ABC World News Tonight
 ☐ CBS Evening News
 ☐ CNBC Kudlow & Company
 ☐ CNBC Morning Call
 ☐ CNN Anderson Cooper 360
 ☐ CNN Lou Dobbs Tonight
 ☐ CNN Paula Zahn Now
 ☑ NBC Meet the Press
 ☑ NBC News Channel 5 at 6P
 ☑ NBC Nightly News
 ☐ WNJN NJN News
 ☑ NBC Today
Series
 ☐ CNN Larry King Live
 ☑ NBC The Tonight Show with Jay Leno
 ☐ PBS Charlie Rose
 ☐ PBS Nightly Business Report
 ☐ PBS Tavis Smiley

PORTABLE COMMUNICATION INTERFACE
FOR ACCESSING MEDIA CONTENT

This application claims the benefit of U.S. Provisional Application No. 61/191,896 filed Sep. 12, 2008, which is incorporated herein by reference.

BACKGROUND OF THE INVENTION

The present invention relates generally to wireless devices and more particularly to wireless devices for accessing media content.

As portable electronic devices become more compact and the number of functions performed by a given device increases, it has become a significant challenge to design a user interface that allows users to easily interact with a multifunction device. This challenge is particularly significant for handheld portable devices, which have much smaller screens than desktop or laptop computers. The user interface is the gateway through which users receive content and facilitate user attempts to access a device's features, tools, and functions. Portable communication devices (e.g., mobile telephones, cell phones, PDA's, Blackberries, etc.) use various modes, such as pushbuttons, microphones, touch screen displays, sensors (e.g., accelerometers, proximity, etc.) and the like, to accept user input.

These portable communication devices are used to access a wide variety of content, including text, video, Internet web pages, and the like. Increasingly, very large volumes of content are available to be searched. However, the current portable communication devices lack adequate display systems and modalities to allow users to easily browse or view high-resolution media content.

Accordingly, improved systems and methods for using wireless devices to access content are required.

BRIEF SUMMARY OF THE INVENTION

The present invention generally provides methods for accessing media with a portable communication device in combination with high-resolution display resources, such as an HDTV set or a computer monitor. Media content along with geographical and other related information is available to users through multiple displays or screens. In one embodiment, a two-screen service allows a user to navigate a world map on a portable communication device to track geo-located media content that matches his or her interests. The user can show a matching video on his portable communication device or direct a nearby display device, such as an HDTV set, to show the video on the TV screen. A three-screen service allows the user to view the information described above, and, in addition, the user can show a map on another computer screen, focusing on the area of interest. The user can also zoom in and out of areas of the world map. All the controls are performed on the portable communication device without relying on the typical TV remote controls or the computer input devices (such as keyboard or mouse). It should be noted that additional viewing devices may be used to augment the two and three screen services described herein.

These and other advantages of the invention will be apparent to those of ordinary skill in the art by reference to the following detailed description and the accompanying drawings.

BRIEF DESCRIPTION OF THE DRAWINGS

FIG. 1A depicts a flow chart illustrating a method of accessing media content via a portable communications device according to one embodiment of the present invention;

FIG. 7 depicts a display of media alerts selected for a user based on user preferences in coordination with a MediaAlert system;

FIG. 8 depicts an interface for allowing a user to enter the user's preferences.

DETAILED DESCRIPTION

Figure 1:
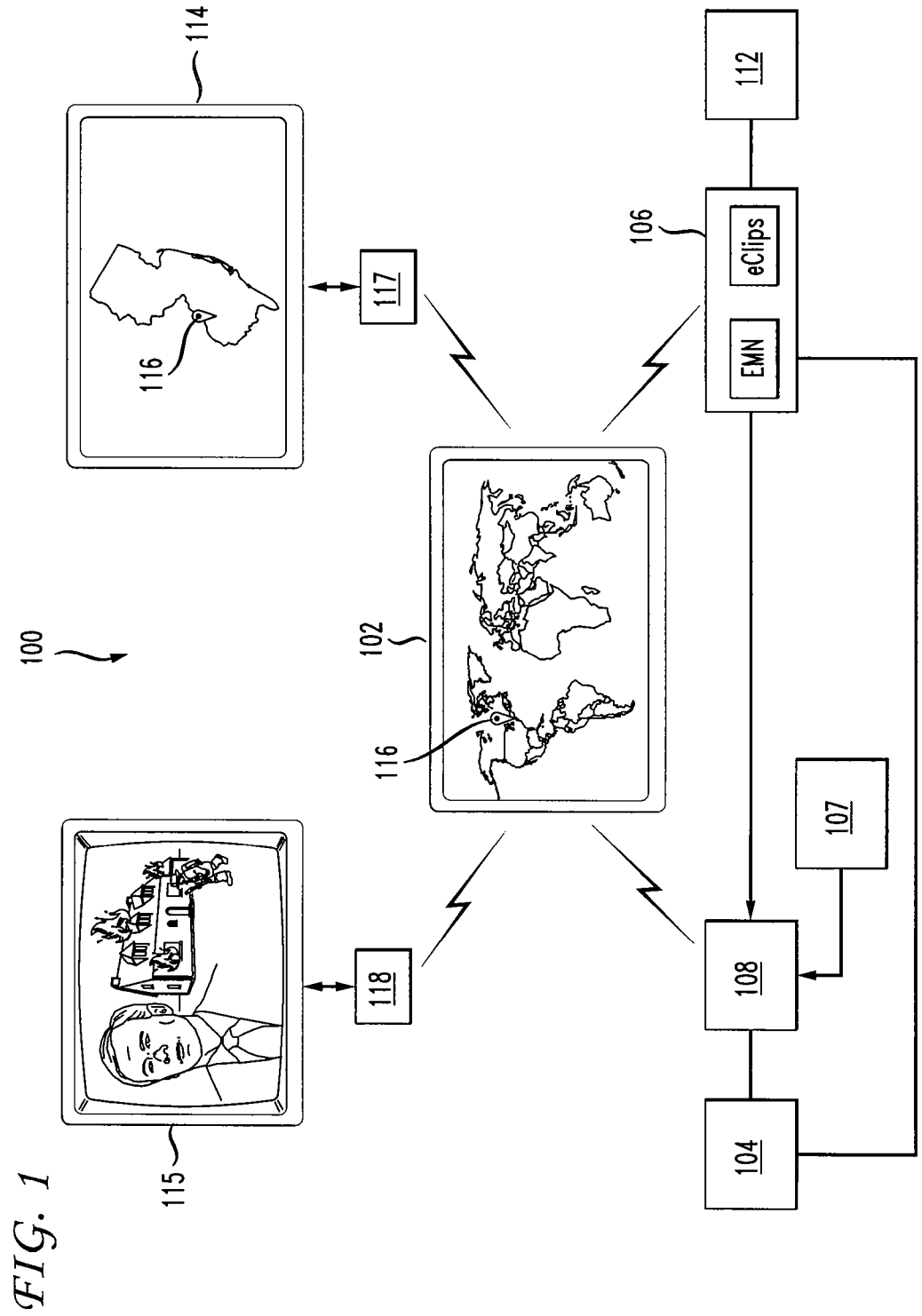
FIG. 1 depicts a media transmission system according to an embodiment of the present invention.

FIG. 1 depicts a media transmission system 100 according to an embodiment of the present invention. Media transmission system 100 includes a portable communication device 102 having, in this embodiment, touch screen display 200. Other embodiments may utilize other types of displays. Portable communication device 102 may be any appropriate multimedia communication device, such as a wireless, mobile, or portable telephone. For example, portable communication device 102 may be an iPhone, BlackBerry, Smartphone, or the like. Components, features, and functions of portable communication device 102 are discussed in further detail below. Portable communication device 102 is shown in wireless communication with web server 108, and media engine 106, each of which provides data to device 102.

Web server 108, in one embodiment, is a computer configured to provide an interface through which portable communication device 102 can access data stored in media archive 104 or media engine 106. Web server 108, in one embodiment, also hosts GeoTracker (described in greater detail below) which determines one or more geographic locations associated with specific media such as a video, audio, or other media. In one embodiment, web server 108 also receives data from RSS provider 107. In another embodiment, web server 108 can serve as a media server to stream audio or video content to a variety of output devices such as portable communications device 102 or different display devices such as display 114 and display 115.

Media engine 106 receives requests for media from portable communication device 102, retrieves content from media archive 104 (via web server 108) and serves the content to the portable communication device 102. Media archive 104 can be implemented as any appropriate storage and/or database for storing requested media and passing the requested media to portable communication device 102. Media archive 104, in one embodiment, is a computer with a memory storing media. Media may be stored on media archive 104 and, in some embodiments, allows for quicker access to the media than would be possible when obtaining media from a media source in a network such as network 112. Media, in one embodiment, is stored in the media archive 104 and may be retrieved by media engine 106 via web server 108. In other embodiments, media may be stored in media engine 106. Accordingly, media engine 106, in one embodiment, is any appropriate computer or related device that receives media from media sources in network 112 or from media archive 104 and generates media clips, segments, chunks, streams, and/or other related portions of media content. Media archive 104, in one embodiment, is in communication with computer 117 (described below). Media generation, chunking, and/or segmenting may be performed in any appropriate manner, such as is described in related U.S. patent application Ser. No. 10/034,679, filed Dec. 28, 2001, incorporated herein by reference. Media generation, chunking, and/or segmenting may be performed by media engine 106 or media archive 104. Although media is described as archived in media archive 104, media may also be archived in media engine 106. Media and data sources in network 112 may be any appropriate media source feeds, such as channel feeds, stored channel content, archived media, media streams, satellite (e.g., DirecTV) feeds, user generated media and/or web content, podcasts, or the like. In alternative embodiments, other databases may be used as media sources. For example, media sources may include a database of movies in a movies-on-demand system, a business (e.g., restaurant, etc.) directory, a phonebook, a corporate directory, or the like. Examples of video sources include those from AP News, YouTube videos or broadcast video content. Though discussed herein in the context of searching for and/or displaying video based on title, genre, channel, etc., one of skill in the art would recognize that other available databases may be used as media sources. Accordingly, search terms and/or displays may include prompts, and/or information for actors, directors, cuisine, city, employee information, personnel information, corporate contact information, and the like.

Media engine 106 is shown in FIG. 1 in communication with network 112 which may be a large network, such as the Internet, or a smaller network such as a local area network (LAN). Media engine 106 is also in communication with web server 108, which in turn, is in communication with media archive 104.

In one embodiment, media engine 106 includes MediaAlert (which is based on eClips and AT&T Enterprise Messaging Network (EMN) and described in related U.S. patent application Ser. No. 11/256,755 filed Oct. 24, 2005, incorporated herein by reference). MediaAlert uses "pointers" provided in received alert emails either to access media segments or to retrieve video clips from media archive 104 or media engine 106. eClips identifies and, in some embodiments, captures portions of programs based on user interests (specified by a user as described below). In one embodiment, portions of programs identified and captured by eClips may be stored in media engine 106.

Web server 108 and media engine 106 are in communication with portable communication device 102 via any appropriate medium, such as a wireless network. That is, in at least one embodiment, portable communication device 102 has access to web server 108 and media engine 106 wirelessly using a Wi-Fi telecommunication network.

Portable communication device 102 is also in communication with computer 117 and media box 118. Media box 118 is in communication with display 115 which may be any appropriate device for displaying media. Media box 118 is configured to receive, interpret, and process signals, commands, or requests from portable communication device 102 to display media on display 115. Display 115, in one embodiment, is a large screen high-definition television but may be other types of displays such as a standard definition display. In one embodiment, portable communication device 102 can be configured as a remote control to control display device 115. Computer 117 is in communication with display 114 and is configured to receive, interpret, and process signals, commands, or requests from portable communication device 102 to display media on display 114. Display 114, in one embodiment, is a monitor connected to computer 117. Although FIG. 1 shows computer 117 and media box 118 as components separate from displays 114 and 115, in one embodiment, the hardware and or functionality of computer 117 and media box 118 may integrated into display 114 and 115, respectively, or in other configurations. In some embodiments, portable communication device 102 is used to initiate and/or control display of media at display device 115. That is, display device 115 may be a television, computer, video player, laptop, speaker, audio system, digital video recorder, television streaming device, and/or any combination thereof. In one embodiment, computer 117 is a Mac Mini and media box 118 is an Apple TV device, however, other devices may be used as well. For example, media box 118, in one embodiment, is a television set top box. In one embodiment, media archive 104 and media box 118 are implemented on a single hardware device.

Although not shown in FIG. 1, in one embodiment, computer 117 and media box 118 can be in communication with other devices such as web server 108 or media engine 106.

As described herein, devices, such as portable communication device 102, are "in communication with" other devices across a Wi-Fi, EDGE, 3G wireless, or other wireless network. One of skill in the art would recognize that other communication methods between components may be used as well where useful or appropriate. For example, displays 114 and 115 may be connected to web server 108 and media engine 106 using wired connections. Such communication may be achieved using other methods as well such through one or more web servers or media servers (108) that host or serve web pages that the portable communication device 102 accesses.

Media transmission system 100 depicts an exemplary system for use in serving media content to a mobile device or other display devices controlled by the mobile device. One of skill in the art would recognize that other appropriate components and systems may be used in conjunction with and/or in replacement of the herein described media transmission system 100. For example, media systems as described in related U.S. patent application Ser. No. 10/034,679, filed Dec. 28, 2001, and U.S. patent application Ser. No. 11/256,755, filed Oct. 24, 2005, each of which incorporated herein by reference, may be used as appropriate.

The operation of media transmission system 100 shown in FIG. 1 will be described in conjunction with FIGS. 1A-8. FIG. 1A depicts flowchart 150, which illustrates a method of accessing media content via a portable communications device according an embodiment of the present invention.

In step 151, portable communications device 102 detects the presence of external display devices such as displays 114 and 115. In one embodiment, this detection, also referred to as device discovery or service discovery, is implemented using a service discovery protocol such as the well known Bonjour. After the display devices are detected, the detected devices are associated with a portable communications device in order to facilitate the display of media on the external displays under the control of portable communications device 102.

In step 152, portable communications device 102 receives data related to media available for display. In step 154, the received data related to the media available for display is displayed to the user (in one embodiment, as pointers identifying a specific location on a map as described in detail below). In step 156, it is determined if user input has been received indicating a user selection of media to be displayed on portable communication device 102. If a user has selected media to be displayed, a request to output the selected media is transmitted to computer 117 and/or media box 118 for output from one or more of displays 114 and 115 in step 158. If no user input has been received, the method proceeds to step 160 in which it is determined if a request has been received from the user to zoom in on a particular map location. If a user request to zoom in or out on an area has been received (in order to view a more detailed display of a particular area), the method proceeds to step 162 and the area of interest indicated by the user is displayed. If a user request is not received, the method loops back to step 156.

An implementation of the method shown in FIG. 1A and described above is described as follows. Portable communication device 102 receives data related to media available for display based on user preferences. The use of user preferences to identify information that may be of interest to a user prevents the user from being bombarded with large amounts of what the user may consider irrelevant. In one embodiment, user preferences include device-specific preferences. For example, a user may enter a preference indicating that all high definition media be output via a high definition display. In another example, a user may also enter a preference indicating that all media to be output from a specific portable device or a media engine be transcoded to a format the destination device is currently configured to output.

Network 112 includes various media and data sources such as news websites and video sharing sites. These media and data sources may be updated frequently. For example, a website providing news may be updated within hours, minutes, or even seconds after an event occurs. Other media and data sources may provide data that is updated less frequently. In one embodiment, media may also be from portable communication device 102. For example, device 102 may be configured to take pictures or video. Media engine 106 is configured to analyze data provided by data sources in network 112 and compare the media and data to user preferences. Media or data that is determined to be relevant to a user's preferences may be flagged or otherwise tagged indicating that the media or data may be of interest to the user. The media or data of interest to the user, in one embodiment, is downloaded or copied to media archive 104 to allow quick access to the media or data in response to a user request. It should be noted that user preferences may be default preferences. For example, prior to a user entering their specific preferences, the user preferences indicate that recent information from one or more news websites should be identified as media for potential display. In one embodiment, a user may record programs using media archive 104 in a manner similar to program recording using a Digital Video Recorder (DVR). In one embodiment, media engine 106 and data sources in network 112 are located remote from the location of other devices depicted in FIG. 1 such as displays 114 and 115. For example, media engine 106 and data sources in network 112 may be located at a service provider.

In one embodiment, the media or data determined to be of interest to a user is then analyzed by GeoTracker located on web server 108. GeoTracker is described in U.S. patent application Ser. No. 11/942,407, filed Nov. 19, 2007 and is incorporated by reference herein. GeoTracker takes an RSS feed, extracts locations from the RSS item descriptions, and then maps these locations to pins on a world map using the Google Map Application Programming Interface (API). In one embodiment, the RSS feeds mapped by GeoTracker are RSS feeds selected using a user profile including user specified keywords. In another embodiment, generic RSS feeds received from RSS provider 107, such as RSS feeds from Yahoo Top Stories, may be mapped by GeoTracker. In yet another embodiment, user specified search criteria or keywords may be transmitted as a search string to a search engine configured to search based on the received search string and return media, for example, an RSS feed that can be mapped by GeoTracker.

GeoTracker may determine one or more geographic locations to which each RSS item is related. For example, a wild fire burning in Santa Barbara, Calif. may be tagged with a location identifier indicating that the data is associated with Santa Barbara, Calif. Data may be assigned more than one location identifier. For example, a news item concerning a retailer who is outsourcing manufacturing to a foreign country may generate location identifiers for the headquarters of the retailer and the location of the foreign manufacturer.

A map is presented to the user on display 200 of device 102 as shown in FIG. 1. Pin 116 indicates that there is media available that may be of interest to a user. Pin 116 is located on the map indicating that the media or data associated with the pointer is also associated with the area indicated by pin 116. Pin 116 shown in FIG. 1 indicates that media or data that may be of interest to a user has been determined to be associated with a location in North America. It should be noted that although only one pin (pin 116) is shown on the world map displayed on portable communication device 102, additional pins may be displayed indicating that media associated with other locations is available. In this embodiment, a world map is shown on display 200. In other embodiment, other maps may be displayed.

Figure 2:
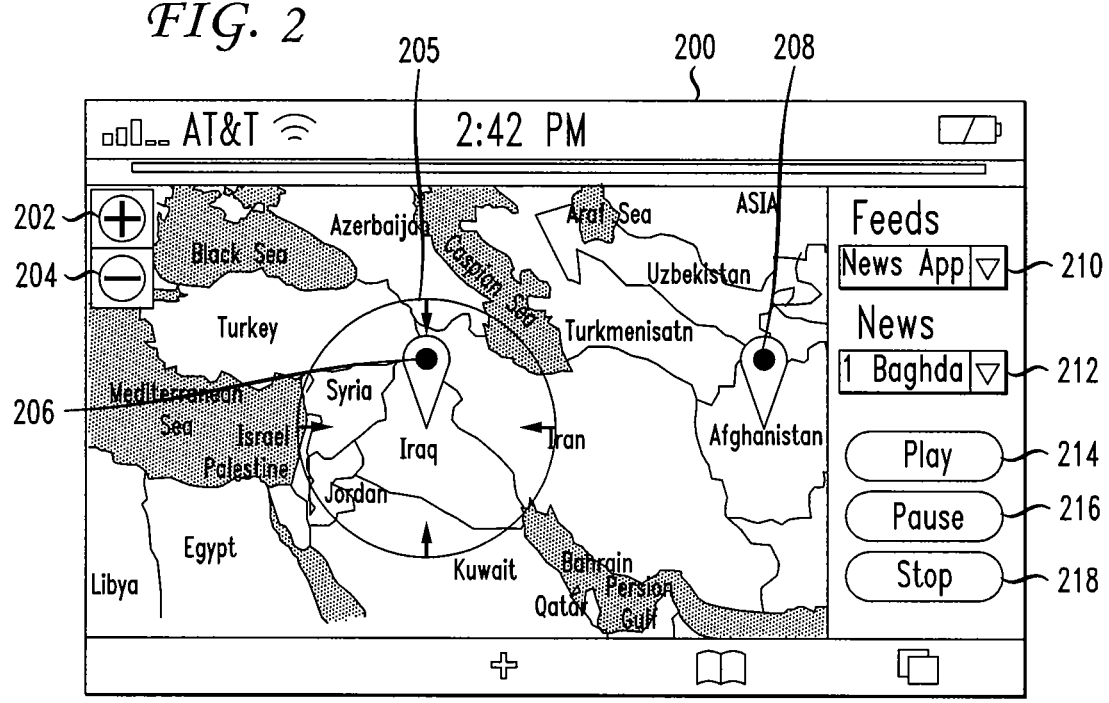
FIG. 2 is a view of the display of a portable communication device according to an embodiment of the present invention.

A user may indicate a desire to zoom in on a particular geographic area by, for example, touching a zoom button 202 on display 200 of device 102 and then touching an area of interest shown on display 200 of FIG. 2. In other embodiments, other techniques or methods for allowing a user to zoom in or out of an area of interest may be used such as touching the screen twice in quick succession over an area of interest. The zoom function may cause the world map displayed on device 102 to be replaced with a map of a local area. FIG. 2 shows display 200 of device 102 displaying a close-up of an area of interest.

FIG. 2 shows display 200 having zoom in button 202 and zoom out button 204 which allow a user to modify the map view shown. In one embodiment, touching zoom in button 202 zooms in on the center of the map shown on display 200. In other embodiments, a user may select an area by touching display 200 and then zoom in to that area by touching zoom button 202. Other methods of manipulating the map view shown in FIG. 2 may be used as well.

In FIG. 2, the user selects one of the media feeds from pull down menu 210. News items associated with the selected feed may be accessed using pull down menu 212. Consequently, the locations corresponding to the items in the selected feed are shown as pins on the world map. FIG. 2 shows display 200 having two pins 206 and 208. Pin 206 has been selected by a user as indicated by highlighting circle 205 or by selecting the corresponding news item from pull down menu 212. Media associated with the selected pin, in one embodiment, is displayed through a media/video player on display 200. In another embodiment, the media is displayed on a remote HDTV connected to a media device that accepts an HTTP request from the mobile device, which is triggered by the selection of the news item. In one embodiment, the selection of the display device depends on the feed selected as each feed may target a different display device. Playback controls, such as play button 214, pause button 216, and stop button 218, are shown on display 200 and allow a user to control the playback of media, such as media selected using pull down menus 210 and 212, and the media is played on a TV display or user's portable communication device. In one embodiment, the controls are implemented through HTTP calls.

Figure 3:
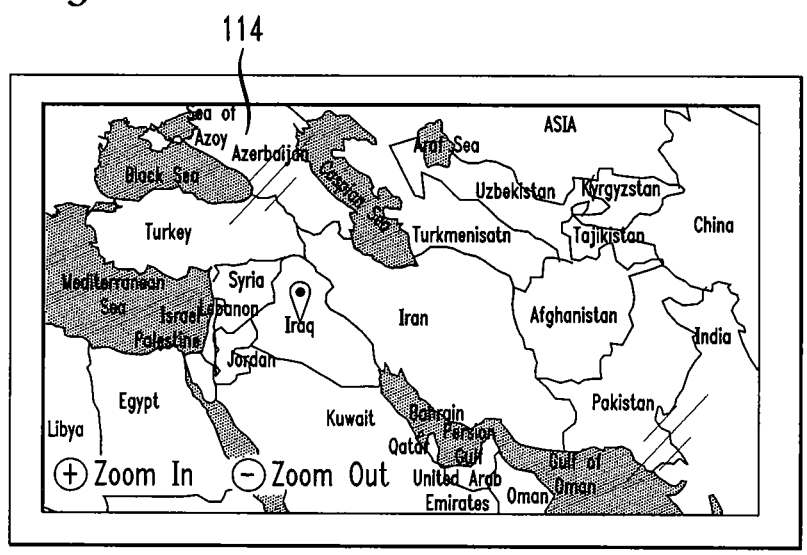
FIG. 3 depicts an exemplary display of a map that may be displayed on an additional display, such as a computer screen.

An area of interest may also be displayed on a different display, such as an LCD display 114 of FIG. 1 which is also shown in FIG. 3. In one embodiment, the whole screen browser on the LCD display is controlled by HTTP calls to the computer connected to LCD display.

FIG. 3 depicts an exemplary display that may be displayed on display 114. Display 114 in FIG. 3 is shown displaying Really Simple Syndication (RSS) data in a geographic presentation layer according to one embodiment of the present invention. This allows the user to navigate (zoom, pan) the RSS view on a world map. This also enables the user to track topics of interest both within a geographic area of interest over time and shifts away from just text driven RSS to a richer content base using multimedia MediaRSS. MediaRSS provides a standardized means of encoding not only high level descriptions of media such as title and genre, but it also allows for metadata including thumbnail images and text segments to include time references to allow for more detailed content annotation. MediaRSS also includes references with locators for multiple versions of the source media so that applications may select the media as appropriate.

Figure 6:
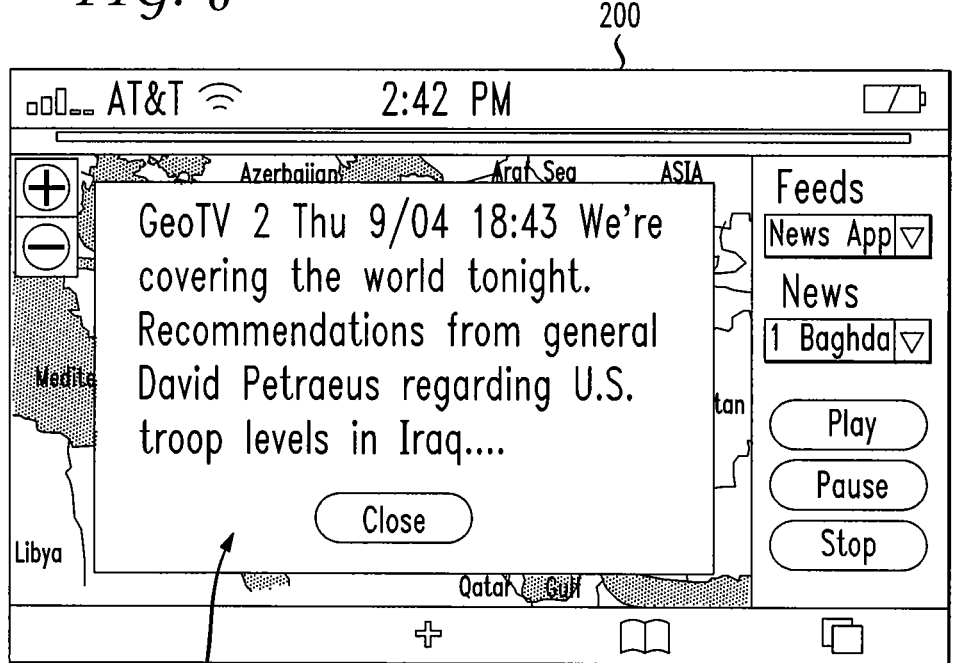
FIG. 6 depicts an information bubble that provides a summary of media associated with a pin indicating a location on a map.

Display 114 in FIG. 3 shows RSS content on a world map at a particular time. A user of portable communication device 102 selects a pin to see media content related to that location and an information bubble appears (as shown in FIG. 6) The information bubble provides the title and a brief description of the RSS story. The related news article or a map of the related area can be displayed on a nearby computer screen. The user can zoom in and out of any area and pan from side to side or up and down. The user has complete control of the display 114 using the user interface on the portable communications device 102.

It should be noted that images shown on display 114, in one embodiment, may be controlled and interacted with via touch screen 200 of portable communication device 102. Thus, touch screen 200 on device 102 may be used to interact with the image and data displayed on both display 200 and display 114. In one embodiment, a toggle button or icon displayed on display 200 of device 102 may be used to toggle between touch screen 200 controlling the image shown on display 200 or display 114. In other embodiments, user input may be entered using other means such as voice commands in conjunction with voice recognition. In response to a user selecting media from either display 200 or display 114, the selected media, in one embodiment can be output from display 115.

Figure 4:
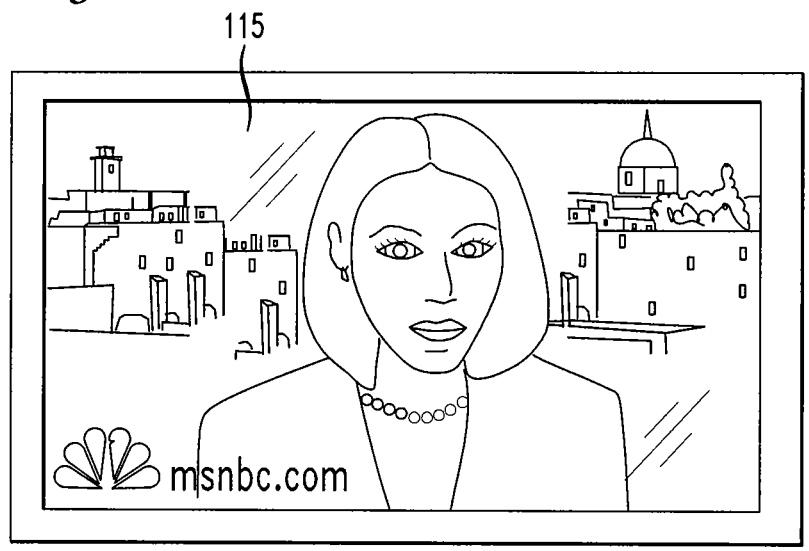
FIG. 4 depicts a video displayed on an HDTV display device based on a command or request from a portable communication device.

In one embodiment, a user selecting media to be output causes portable communication device 102 to transmit a request signal to either web server 108 or media engine 106 depending on the storage location of the selected media. Receipt of the request signal causes either web server 108 or media engine 106 to transmit data representing the media to be output to display 115. Display 115 then outputs the media as shown in FIG. 4 which depicts display 115 showing media selected using portable communication device 102. Display 115 receives and subsequently displays the requested media according to user commands received through touch screen 200 of portable communication device 102. For example, a user may control a video displayed on display 115 using playback controls 214, 216, and 218 shown in FIG. 2. Other controls for video playback and controls for viewing text, such as scroll bars, may be used as well. It should be noted that, in some embodiments, request signals indicating user selection of media to be output may be transmitted from portable communications device 102 to computer 117 and/or media box 118 associated with displays 114 and 115, respectively. It should also be noted that the selection can be generalized to the case when the user selects multiple media items in some order (e.g., chronological, geographic, etc.) and instructs the media box to play all associated items one after another. In a three-screen service, the user would instruct the computer screen to display the map and the HDTV to replay the associated media item following the order of selection.

Figure 5:
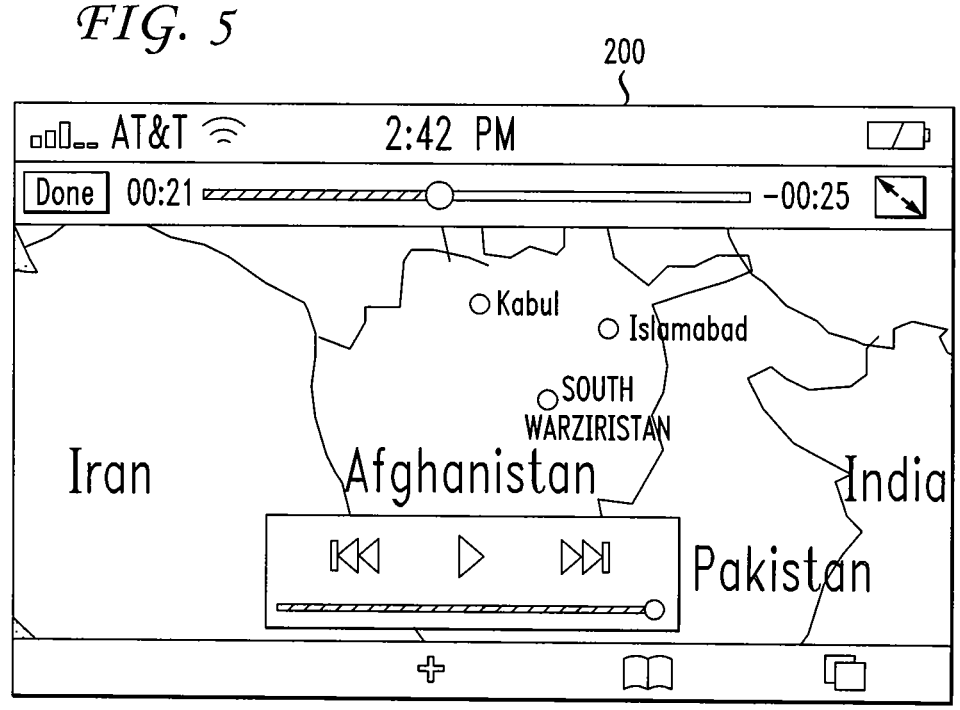
FIG. 5 shows a video related to a location displayed on the display of a portable communication device in response to a user input.

In some embodiments, media may be additionally output from display 200. For example, FIG. 5 shows a video being played back on display 200. The video output from display 200 may be a lower resolution version of the same video output which can be simultaneously shown on display 115 and include playback controls. In some embodiments, display 200 may be used to provide a low resolution preview of media before displaying the media on larger display 115. In still other embodiments, a user may display different media on display 200 and display 115, thereby allowing a user to view different media simultaneously. It should be noted that various user interfaces may be used to select which display is used for media playback. For example, a choice of outputting media to display 200 or display 115 may be presented to a user after media is selected to be output. Media selected for output from display 200 causes a request to be sent to either web server 108 or media server 106 which then transmits data representing the media to be output to portable communication device 102.

In one embodiment, a user is provided with a preview of the media related to a pin indicating a location on a map such as the map shown on display 200 in FIG. 2. A user moving a cursor, finger, or other pointing device over the pin causes a pop-up window to be displayed, such as pop-up window 220 shown in FIG. 6. Pop-up window 220, as shown in FIG. 6, includes a portion of the media associated with the pin. In some embodiments, a synopsis or the media associated with the pin may be shown. In other embodiments, other methods of providing an overview of the media may be used such as displaying several still frames of a video associated with the pin.

In some embodiments, portable communication device 102 may be configured to automatically display media alerts generated for a particular user based on user preferences. FIG. 7 shows media alerts selected for a user based on the user's preferences. As shown in FIG. 7, various news items have been determined to be of possible interest to a user and are displayed with a thumbnail and a brief description of the media. These media alerts are typically displayed on display 200 of portable communication device 102 but may also be displayed on either of displays 114 and 115 as well. A user may select a media alert by touching the area of display 200 associated with the media alert or by one of the other methods described above for selecting an image on display 200. The media associated with the media alert may then be output from display 200 or display 115 as described above.

FIG. 8 shows an example of an interface 800 that can be output from display 200 and enable a user to enter or modify user preferences. From the topics of interest section 802, a user can select various topics and subject matters of interest to the user. For example, as shown in FIG. 8, a user may be interested in information concerning the weather and disasters. Although not shown, a user may further specify topics of interest. For example, a user may specify that he or she is interested in weather and disasters at a particular location. In one embodiment, a user can additionally specify a list or set of keywords that may be associated with a topic. In other embodiments, other interfaces and menus may be used to allow a user to enter their preferences with varying degrees of granularity. For example, a user may be provided with the option to set preferences regarding broad categories such as sports. A user may also be provided with more specific options that allow the user to more specifically define preferences, such as a preference for a particular team playing a particular sport. User preferences may also allow a user to define preferences based on geography, subject, event, etc. As shown in FIG. 8, a user may edit or delete the topics of interest by selecting "edit" or "delete" respectively.

eClips Sources section 804 of interface 800 enables a user to select various programs from which media clips will be extracted based on user selections in topics of interest section 802. For example, a user has selected NBC Meet the Press as shown in eClips sources section 804. The selected program will be analyzed to determine if it contains media related to the topic selected by the user in topics of interest section 802.

In one embodiment, a user can enter search criteria and/or keywords to portable communications device 102 to initiate an immediate search for media related to the user input. For example, a user who wants to review media for a topic not identified using the interface of FIG. 8 and may enter search criteria or keywords without using the interface of FIG. 8. In one embodiment, search criteria or keywords may be spoken by a user and converted to a computer readable format by portable communications device 102 using techniques such as voice/speech recognition. Media available for output may then be displayed on a map as previously described above using pointers at specific locations on the map to indicate that media related to that geographic location is available for output.

Figure 9:
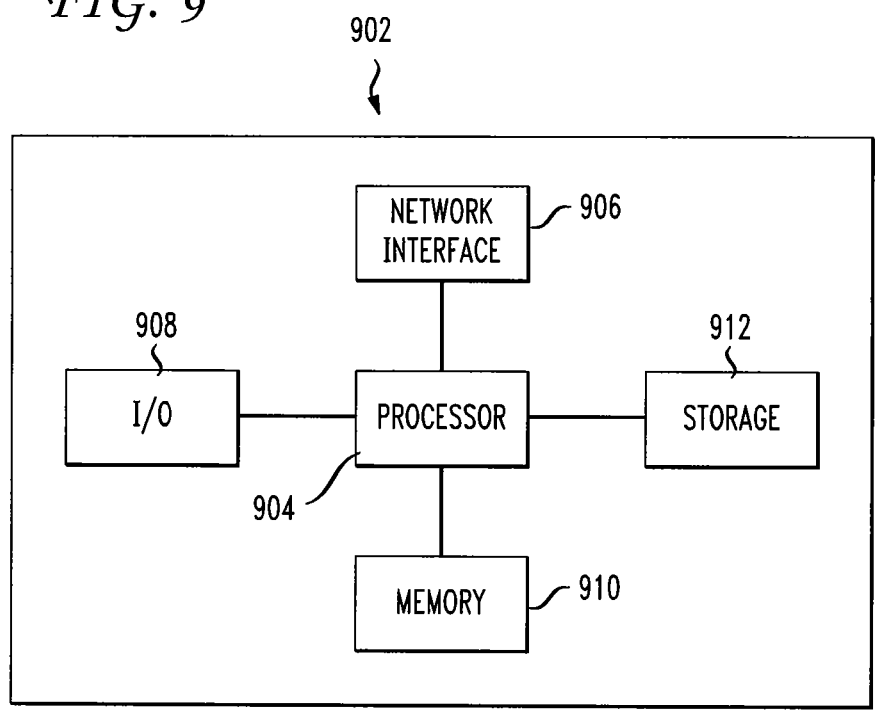
FIG. 9 is a high-level block diagram of a computer that may be used to implement the devices shown in FIG. 1 (e.g., portable communication device 102, web server 108, media engine 106, computer 117, media box 118, and media archive 104).

Each of portable communication device 102, web server 108, media engine 106, computer 117, media box 118, and media archive 104 may be implemented using a computer. A high-level block diagram of such a computer is illustrated in FIG. 9. Computer 902 contains a processor 904, which controls the overall operation of the computer 902 by executing computer program instructions which define such operation. The computer program instructions may be stored in a storage device 912, or other computer readable medium (e.g., magnetic disk, CD ROM, etc.), and loaded into memory 910 when execution of the computer program instructions is desired. Thus, the operations described above and shown in FIGS. 1-8 can be defined by the computer program instructions stored in the memory 910 and/or storage 912 and controlled by the processor 904 executing the computer program instructions. For example, the computer program instructions can be implemented as computer executable code programmed by one skilled in the art to perform the operations described in conjunction with FIGS. 1-8. Accordingly, by executing the computer program instructions, the processor 904 executes an algorithm defined by the operations described in conjunction with FIGS. 1-8. The computer 902 also includes one or more network interfaces 906 for communicating with other devices via a network. The computer 902 also includes input/output devices 908 that enable user interaction with the computer 902 (e.g., display, keyboard, mouse, speakers, buttons, etc.) One skilled in the art will recognize that an implementation of an actual computer could contain other components as well, and that FIG. 9 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for accessing media using a portable communication device comprising:
    receiving data at the portable communication device related to media available for output, the media available for output associated with a geographic location;
    displaying a map at the portable communication device with a pointer located at the geographic location on the map indicating that the media available for output associated with the geographic location is available for output;
    displaying a close-up of a particular geographic area in response to receiving user input specifying the particular geographic area, the close-up of the particular geographic area displayed with a pointer associated with media available for output associated with the particular geographic location, the pointer located at the particular geographic location;
    receiving a user selection indicating media to be output;
    detecting, by the portable communication device, a presence of a first output device;
    associating the first output device with the portable communication device in response to the detecting; and
    transmitting a request signal, to output the media to be output, to the first output device, wherein the first output device is separate from the portable communications device.

2. The method of claim 1 further comprising:
    receiving user input specifying the particular geographic area.

3. The method of claim 2, further comprising: transmitting a request signal to a second output device to output the close-up of the particular geographic area in response to the receiving user input specifying the particular geographic area, the second output device separate from the portable communications device and the first output device.

4. The method of claim 1, wherein a type of media related to the geographic location is displayed in response to a user selection of the pointer at the geographic location.

5. The method of claim 1, wherein the pointer located at the geographic location is based on user input indicating search criteria.

6. The method of claim 1, wherein the receiving a user selection indicating media to be output includes receiving user input identifying a type of media to be output.

7. The method of claim 1, wherein the receiving data comprises:
    automatically receiving data at the portable communication device, the data related to media available for output based on user preferences.

8. The method of claim 7 wherein the user preferences pertain to device-specific preferences.

9. The method of claim 1, further comprising:
outputting user selected media from the first output device in response to the request signal.

10. The method of claim 1 wherein the detecting, by the portable communication device, a presence of a first output device is implemented using a service discovery protocol.

11. A portable communication device comprising:
a processor;
a memory to store computer program instructions, the computer program instructions when executed on the processor cause the processor to perform operations comprising:
receiving data at the portable communication device related to media available for output associated with a geographic location;
displaying a map at the portable communication device with a pointer located at the geographic location on the map indicating that the media available for output associated with the geographic location is available for output;
displaying a close-up of a particular geographic area in response to receiving user input specifying the particular geographic area, the close-up of the particular geographic area displayed with a pointer associated with media available for output associated with the particular geographic location, the pointer located at the particular geographic location;
receiving a user selection indicating media to be output;
detecting, by the portable communication device, a presence of a first output device;
associating the first output device with the portable communication device in response to the detecting; and
transmitting a request signal, to output the media to be output, to the first output device, wherein the first output device is separate from the portable communication device.

12. The portable communication device of claim 11, the operations further comprising:
receiving user input specifying the particular geographic area.

13. The portable communication device of claim 12, the operations further comprising:
transmitting a request signal to a second output device to output the close-up of the particular geographic area in response to the receiving user input specifying the particular geographic area, the second output device separate from the portable communications device and the first output device.

14. The portable communication device of 11, wherein a type of media related to the geographic location is displayed in response to a user selection of the pointer at the geographic location.

15. The portable communications device of 11, wherein the pointer located at the geographic location is based on user input indicating search criteria.

16. The portable communication device of 11, wherein the receiving a user selection indicating media to be output includes receiving user input identifying a type of media to be output.

17. The portable communication device of claim 11, wherein the receiving data comprises:
automatically receiving data at the portable communication device, the data related to media available for output based on user preferences.

18. The portable communication device of claim 17 wherein the user preferences pertain to device-specific preferences.

19. The portable communication device of claim 11 where the detecting, by the portable communication device, a presence of a first output device is implemented using a service discovery protocol.

20. A non-transitory computer readable medium storing computer program instructions for accessing media using a portable communication device, which, when executed on a processor, cause the processor to perform operations comprising:
receiving data at the portable communication device related to media available for output, the media available for output associated with a geographic location;
displaying a map at the portable communication device with a pointer located at the geographic location on the map indicating that the media associated with the geographic location is available for output;
displaying a close-up of a particular geographic area in response to receiving user input specifying the particular geographic area, the close-up of the particular geographic area displayed with a pointer associated with media available for output associated with the particular geographic location, the pointer located at the particular geographic location;
receiving a user selection indicating media to be output;
detecting, by the portable communication device, a presence of a first output device;
associating the first output device with the portable communication device in response to the detecting; and
transmitting a request signal, to output the media to be output, to the first output device, wherein the first output device is separate from the portable communication device.

21. The computer readable medium of claim 20, the operations further comprising:
receiving user input specifying the particular geographic area.

22. The computer readable medium of claim 21, the operations further comprising:
transmitting a request signal to a second output device to output the close-up of the particular geographic area in response to the receiving user input specifying the particular geographic area, the second output device separate from the portable communications device and the first output device.

23. The computer readable medium of claim 20, wherein a type of media related to the geographic location is displayed in response to a user selection of the pointer at the geographic location.

24. The computer readable medium of claim 20, wherein the pointer located at the geographic location is based on user input indicating search criteria.

25. The computer readable medium of claim 20, wherein the receiving a user selection indicating media to be output includes receiving user input identifying a type of media to be output.

26. The computer readable medium of claim 20, wherein the receiving data comprises:
automatically receiving data at the portable communication device, the data related to media available for output based on user preferences.

27. The computer readable medium of claim 26 wherein the user preferences pertain to device-specific preferences.

28. The computer readable medium of claim 20 wherein the detecting, by the portable communication device, a presence of a first output device is implemented using a service discovery protocol.

* * * * *